United States Patent
Aoki

(10) Patent No.: US 12,544,000 B2
(45) Date of Patent: Feb. 10, 2026

(54) DISORDER DETECTION SYSTEM, ITS DISORDER DETECTION METHOD, AND PROGRAM

(71) Applicant: TOYOTA JIDOSHA KABUSHIKI KAISHA, Toyota (JP)

(72) Inventor: Eisuke Aoki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 394 days.

(21) Appl. No.: 18/144,977

(22) Filed: May 9, 2023

(65) Prior Publication Data

US 2023/0363693 A1 Nov. 16, 2023

(30) Foreign Application Priority Data

May 13, 2022 (JP) ................. 2022-079407

(51) Int. Cl.
*A61B 5/11* (2006.01)
*A61B 5/00* (2006.01)
*A61B 5/22* (2006.01)
*A63B 22/06* (2006.01)

(52) U.S. Cl.
CPC .......... *A61B 5/4023* (2013.01); *A61B 5/1121* (2013.01); *A61B 5/221* (2013.01); *A61B 5/6895* (2013.01); *A61B 5/702* (2013.01); *A61B 5/7278* (2013.01); *A61B 5/742* (2013.01); *A63B 22/0694* (2013.01); *A63B 2208/0233* (2013.01)

(58) Field of Classification Search
CPC ...... A61B 5/1121; A61B 5/221; A61B 5/6895
See application file for complete search history.

(56) References Cited

U.S. PATENT DOCUMENTS

| | | | |
|---|---|---|---|
| 2007/0032748 A1* | 2/2007 | McNeil ................ | A61B 5/1121 600/595 |
| 2009/0240171 A1* | 9/2009 | Morris Bamberg . | A61B 5/0002 600/595 |
| 2010/0262048 A1* | 10/2010 | Shinomiya ............. | A61H 1/005 601/35 |
| 2018/0318639 A1* | 11/2018 | Kim ................... | A63B 22/0046 |
| 2020/0286398 A1* | 9/2020 | Inoue ................. | G02B 27/0179 |
| 2020/0375503 A1* | 12/2020 | Hiyama ................ | G16H 50/30 |
| 2021/0113890 A1* | 4/2021 | Posnack ........... | A63B 21/00178 |

FOREIGN PATENT DOCUMENTS

JP 3927340 B2 6/2007

\* cited by examiner

*Primary Examiner* — Daniel L Cerioni
(74) *Attorney, Agent, or Firm* — Dinsmore & Shohl LLP

(57) ABSTRACT

A disorder detection system includes: a pair of left and right footrests configured so that left and right feet of a user are respectively placed thereon to perform an exercise of legs therewith; a pair of left and right slide mechanisms for enabling the footrests to slide in a front/rear direction with respect to a sitting part, the slide mechanisms including a resistance part for applying a resistance to the sliding; a moving mechanism for enabling the left and right slide mechanisms and the footrests to move independently of each other; an angle detection unit for detecting angles of joints of left and right lower legs of the user around a roll axis, a yaw axis, and a pitch axis; and a display unit for displaying the detected angles of the joints of the left and right lower legs of the user around the roll, yaw, and pitch axes.

13 Claims, 10 Drawing Sheets

DISORDER DETECTION SYSTEM, ITS DISORDER DETECTION METHOD, AND PROGRAM

CROSS REFERENCE TO RELATED APPLICATIONS

This application is based upon and claims the benefit of priority from Japanese patent application No. 2022-079407, filed on May 13, 2022, the disclosure of which is incorporated herein in its entirety by reference.

BACKGROUND

The present disclosure relates to a disorder detection system, a disorder detection method, and a program for detecting a physical disorder of a user.

An apparatus that assesses a balancing ability of a user by using a swinging chair or the like of which the sitting part or the like swings has been known (see, for example, Japanese Patent No. 3927340).

SUMMARY

Meanwhile, it is desired to realize a system that can detect a physical disorder related to the left/right balance of a user.

The present disclosure has been made in view of the above-described problem, and an object thereof is to provide a disorder detection system, a disorder detection method performed thereby, and a program capable of detecting a physical disorder of a user related to his/her left/right balance.

To achieve the above-described object, a first exemplary aspect is a disorder detection system including:
  a pair of left and right footrests configured so that left and right feet of a user are respectively placed thereon, and the user performs an exercise of his/her legs therewith;
  a pair of left and right slide mechanisms configured to enable the footrests to slide in a front/rear direction with respect to a sitting part, the pair of left and right slide mechanisms including a resistance part configured to apply a resistance to the sliding;
  a moving mechanism configured to enable the left and right slide mechanisms and the footrests to move independently of each other;
  an angle detection unit configured to detect angles of joints of left and right lower legs of the user around a roll axis, a yaw axis, and a pitch axis; and
  a display unit configured to display the detected angles of the joints of the left and right lower legs of the user around the roll, yaw, and pitch axes detected by the angle detection unit.

In this aspect, the display unit may display a sum total of the angles of the joints of the left lower leg of the user around the roll, yaw, and pitch axes and a sum total of those of the right lower leg of the user around the same in a comparative manner.

In this aspect, the disorder detection system may further include an assessment unit configured to assess an output balance between the left and right lower legs of the user by comparing the sum total of the angles of the joints of the left lower leg of the user around the roll, yaw, and pitch axes and the sum total of those of the right lower leg of the user around the same detected by the angle detection unit.

In this aspect, the assessment unit may assess that the output balance between the left and right lower legs of the user is poor when a difference between the sum total of the angles of the joints of the left lower leg of the user around the roll, yaw, and pitch axes and the sum total of those of the right lower leg of the user around the same detected by the angle detection unit is equal to or larger than a threshold.

In this aspect, the moving mechanism may independently rotate the left and right footrests in a circular or elliptical trajectory according to depressing of the left and right footrests by the feet of the user.

To achieve the above-described object, another exemplary aspect is a disorder detection method for a disorder detection system,
  the disorder detection system including:
    a pair of left and right footrests configured so that left and right feet of a user are respectively placed thereon, and the user performs an exercise of his/her legs therewith;
    a pair of left and right slide mechanisms configured to enable the footrests to slide in a front/rear direction with respect to a sitting part; and
    a moving mechanism configured to enable the left and right slide mechanisms and the footrests to move independently of each other,
  the disorder detection method including:
    detecting angles of joints of left and right lower legs of the user around a roll axis, a yaw axis, and a pitch axis; and
    displaying the detected angles of the joints of the left and right lower legs of the user around the roll, yaw, and pitch axes.

To achieve the above-described object, another exemplary aspect is a program for a disorder detection system,
  the disorder detection system including:
    a pair of left and right footrests configured so that left and right feet of a user are respectively placed thereon, and the user performs an exercise of his/her legs therewith;
    a pair of left and right slide mechanisms configured to enable the footrests to slide in a front/rear direction with respect to a sitting part; and
    a moving mechanism configured to enable the left and right slide mechanisms and the footrests to move independently of each other,
  the program being adapted to cause a computer to perform:
    a process for detecting angles of joints of left and right lower legs of the user around a roll axis, a yaw axis, and a pitch axis; and
    a process for displaying the detected angles of the joints of the left and right lower legs of the user around the roll, yaw, and pitch axes.

To achieve the above-described object, another exemplary aspect is a disorder detection system including:
  a sitting part configured to enable a user to sit thereon and rotate around a roll axis and a yaw axis;
  a pair of left and right footrests configured so that left and right feet of the user are respectively placed thereon, and the user performs an exercise of his/her legs therewith;
  a moving mechanism configured to enable the left and right footrests to move in a linked manner;
  an angle detection unit configured to detect angles of joints of left and right lower legs of the user around a roll axis, a yaw axis, and a pitch axis; and
  a display unit configured to display the detected angles of the joints of the left and right lower legs of the user around the roll, yaw, and pitch axes detected by the angle detection unit.

In this aspect, the display unit may display a sum total of the angles of the joints of the left lower leg of the user around the roll, yaw, and pitch axes and a sum total of those of the right lower leg of the user around the same in a comparative manner.

In this aspect, the disorder detection system may further include an assessment unit configured to assess whether a trunk of the user is out of balance by comparing the sum total of the angles of the joints of the left lower leg of the user around the roll, yaw, and pitch axes and the sum total of those of the right lower leg of the user around the same detected by the angle detection unit.

In this aspect, the assessment unit may assess that the trunk of the user is out of balance when it has determined that the sum total of the angles of the joints of the left lower leg of the user around the roll, yaw, and pitch axes detected by the angle detection unit is larger than the sum total of the angles of the joints of the right lower leg around the roll, yaw, and pitch axes, or when it has determined that the sum total of the angles of the joints of the left lower leg of the user around the roll, yaw, and pitch axes is smaller than the sum total of the angles of the joints of the right lower leg around the roll, yaw, and pitch axes.

In this aspect, the assessment unit may assess that the trunk of the user is inclined to the right and his/her sitting load balance is also off to the right when it has determined that the sum total of the angles of the joints of the left lower leg of the user around the roll, yaw, and pitch axes detected by the angle detection unit is larger than the sum total of the angles of the joints of the right lower leg around the roll, yaw, and pitch axes, and the assessment unit may assess that the trunk of the user is inclined to the left and his/her sitting load balance is also off to the left when it has determined that the sum total of the angles of the joints of the right lower leg of the user around the roll, yaw, and pitch axes is larger than the sum total of the angles of the joints of the left lower leg around the roll, yaw, and pitch axes.

To achieve the above-described object, another exemplary aspect is a disorder detection method for a disorder detection system, the disorder detection system including:
a sitting part configured to enable a user to sit thereon and rotate around a roll axis and a yaw axis;
a pair of left and right footrests configured so that left and right feet of the user are respectively placed thereon, and the user performs an exercise of his/her legs therewith; and
a moving mechanism configured to enable the left and right footrests to move in a linked manner,
the disorder detection method including:
detecting angles of joints of left and right lower legs of the user around a roll axis, a yaw axis, and a pitch axis; and
displaying the detected angles of the joints of the left and right lower legs of the user around the roll, yaw, and pitch axes.

To achieve the above-described object, another exemplary aspect is a program for a disorder detection system,
the disorder detection system including:
a sitting part configured to enable a user to sit thereon and rotate around a roll axis and a yaw axis;
a pair of left and right footrests configured so that left and right feet of the user are respectively placed thereon, and the user performs an exercise of his/her legs therewith; and
a moving mechanism configured to enable the left and right footrests to move in a linked manner,
the program being adapted to cause a computer to perform:

a process for detecting angles of joints of left and right lower legs of the user around a roll axis, a yaw axis, and a pitch axis; and
a process for displaying the detected angles of the joints of the left and right lower legs of the user around the roll, yaw, and pitch axes.

To achieve the above-described object, another exemplary aspect is a disorder detection system including:
a sitting part configured to enable a user to sit thereon and rotate around a roll axis and a yaw axis;
a pair of left and right footrests configured so that left and right feet of the user are respectively placed thereon and can rotate around the roll, yaw, and pitch axes to enable the user performs an exercise of his/her legs therewith;
a moving mechanism configured to enable the left and right footrests to move in a linked manner;
an angle detection unit configured to detect angles of joints of left and right lower legs of the user around a roll axis, a yaw axis, and a pitch axis; and
a display unit configured to display the detected angles of the joints of the left and right lower legs of the user around the roll, yaw, and pitch axes detected by the angle detection unit.

In this aspect, the display unit may display, in a comparative manner,
a sum total of angles of a hip joint of the left lower leg of the user around the roll, yaw, and pitch axes detected by the angle detection unit, a sum total of angles of a knee joint of the left lower leg around the roll, yaw, and pitch axes, and a sum total of angles of an ankle joint of the left lower leg around the roll, yaw, and pitch axes, and
a sum total of angles of a hip joint of the right lower leg around the roll, yaw, and pitch axes, a sum total of angles of a knee joint of the right lower leg around the roll, yaw, and pitch axes, and a sum total of angles of an ankle joint of the right lower leg around the roll, yaw, and pitch axes.

In this aspect, the disorder detection system may further include a disorder specifying unit configured to specify a physically disordered part of the user based on differences between
a sum total of angles of a hip joint of the left lower leg of the user around the roll, yaw, and pitch axes detected by the angle detection unit, a sum total of angles of a knee joint of the left lower leg around the roll, yaw, and pitch axes, and a sum total of angles of an ankle joint of the left lower leg around the roll, yaw, and pitch axes, and
a sum total of angles of a hip joint of the right lower leg around the roll, yaw, and pitch axes, a sum total of angles of a knee joint of the right lower leg around the roll, yaw, and pitch axes, and a sum total of angles of an ankle joint of the right lower leg around the roll, yaw, and pitch axes, respectively.

In this aspect, the disorder specifying unit may specify, as the disordered part, at least one of a pair of hip joints, a pair of knee joints, and a pair of ankle joints of the left and right lower legs of the user of which an angular difference between a sum total of angles of the joint of the left lower leg around the roll, yaw, and pitch axes detected by the angle detection unit and a sum total of angles of the joint of the right lower leg around the roll, yaw, and pitch axes is equal to or larger than a threshold.

To achieve the above-described object, another exemplary aspect is a disorder detection method for a disorder detection system,
the disorder detection system including:

a sitting part configured to enable a user to sit thereon and rotate around a roll axis and a yaw axis;

a pair of left and right footrests configured so that left and right feet of the user are respectively placed thereon and can rotate around the roll, yaw, and pitch axes to enable the user performs an exercise of his/her legs therewith; and a moving mechanism configured to enable the left and right footrests to move in a linked manner, the disorder detection method including:

detecting angles of joints of left and right lower legs of the user around a roll axis, a yaw axis, and a pitch axis; and displaying the detected angles of the joints of the left and right lower legs of the user around the roll, yaw, and pitch axes.

To achieve the above-described object, another exemplary aspect is a program for a disorder detection system, the disorder detection system including:

a sitting part configured to enable a user to sit thereon and rotate around a roll axis and a yaw axis;

a pair of left and right footrests configured so that left and right feet of the user are respectively placed thereon and can rotate around the roll, yaw, and pitch axes to enable the user performs an exercise of his/her legs therewith; and a moving mechanism configured to enable the left and right footrests to move in a linked manner, the program being adapted to cause a computer to perform:

a process for detecting angles of joints of left and right lower legs of the user around a roll axis, a yaw axis, and a pitch axis; and a process for displaying the detected angles of the joints of the left and right lower legs of the user around the roll, yaw, and pitch axes.

According to the present disclosure, it is possible to provide a disorder detection system, a disorder detection method performed thereby, and a program capable of detecting a physical disorder of a user related to his/her left/right balance.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
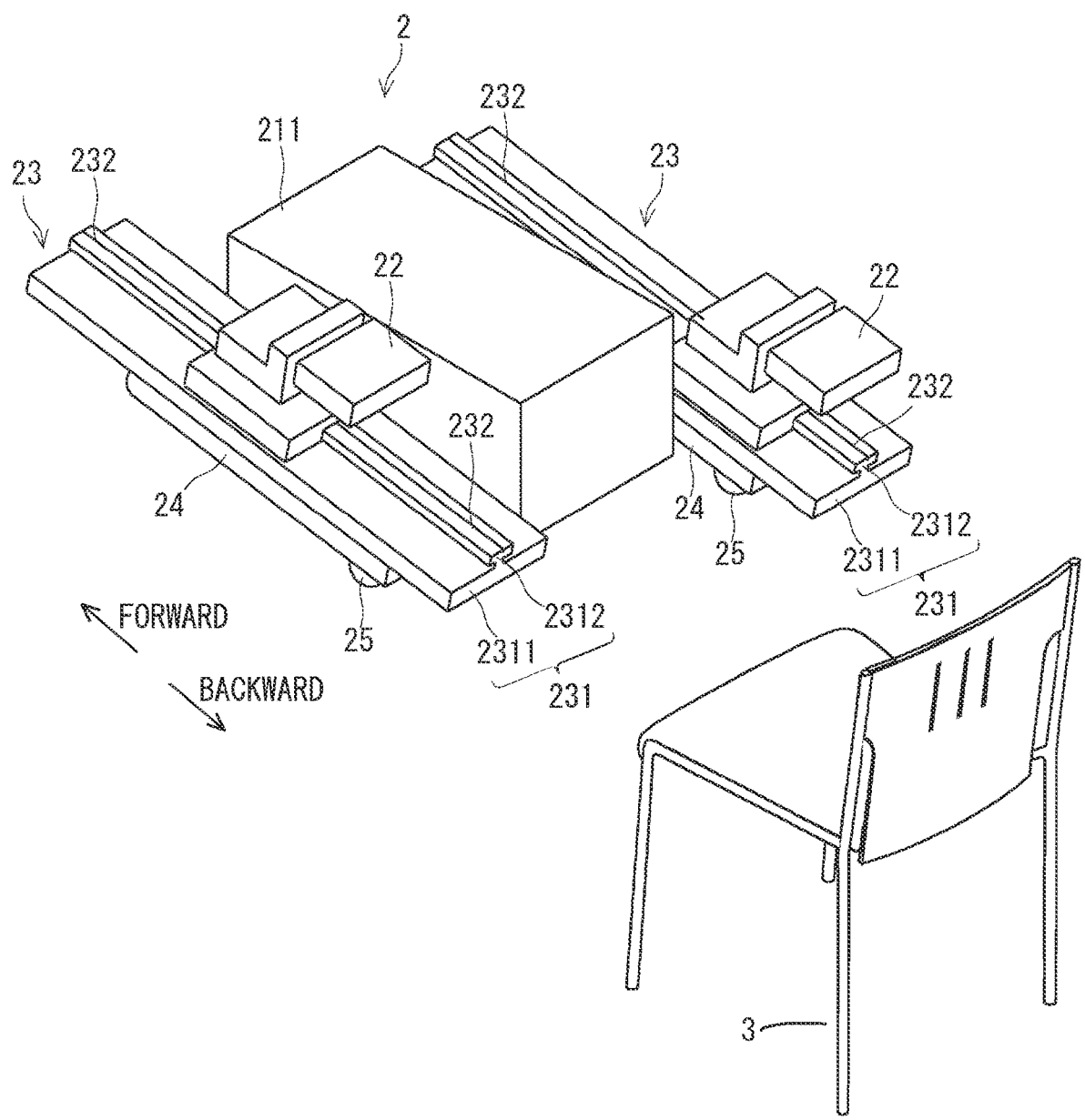
FIG. 1 is a perspective view showing a foot-pedaling exercise apparatus according to an embodiment.

The present disclosure will be described hereinafter through embodiments of the present disclosure, but the present disclosure according to the claims is not limited to the below-shown embodiments. Further, not all of the components/structures described in the embodiments are indispensable for solving the problem.

In a disorder detection system according to this embodiment, since a user performs a lower-leg exercise in a sitting posture, there is an advantage that it is less likely to be affected by posture control and hence it is easy to assess a pure kinematic chain (i.e., a kinematic chain unaffected from any other factors). Note that the kinematic chain is a chain through which, when a motion occurs in a certain joint, the effect of the motion is transferred (or spread) to an adjacent joint(s).

According to the disorder detection system in accordance with this embodiment, a pure kinematic chain (i.e., the unaffected kinematic chain) is assessed while eliminating the adverse effect of the posture control of a user by having the user perform a lower-leg exercise such as a foot-pedaling exercise while sitting on a sitting part or the like, so that it is possible to detect a deterioration factor(s) for the physical performance of the lower legs and the trunk of the user and to detect an imbalance between the left and right sides of his/her body.

Note that, in the following description, "left and right" are defined as left and right as observed from the user in the sitting position, and "front and rear" are defined as front and rear as observed from the user in the sitting position. Embodiments according to the present disclosure will be described hereinafter in detail with reference to the drawings.

First Embodiment

For example, a foot-pedaling exercise is a cyclical exercise. Therefore, in an ordinary foot-pedaling exercise apparatus, depending on the number of revolutions (e.g., depending on the rotational speed), a difference between the movement of the left footrest and that of the right footrest is less likely to be observed.

In contrast to this, a foot-pedaling exercise apparatus according to a first embodiment is configured so that right and left footrests, on which the right and left feet of the user are respectively placed, are operated independently of each other, and the footrests can freely slide forward and backward, so that there is a larger redundant degree of freedom in the exercises performed by the lower legs of the user.

People tend to move, due to a kinematic chain, one of two counterpart body parts (e.g., one of a pair of legs) that they can move more easily than the other body part more widely than the other body part. For example, a patient is less likely to move his/her diseased leg in which he/she feels a pain than he/she is to move his/her healthy leg, and hence the amount of sliding of the footrest on the diseased-leg side may be smaller than that of the footrest on the healthy-leg side, so that there may be a significant difference between the former movement and the latter one.

Further, a small distortion of the trunk of a person causes asymmetric motions. This asymmetry also occurs in motions of the person. In this embodiment, a difference between a movement on the left side of a body and that on the right side of the body caused by asymmetry of a person is detected more effectively by the above-described configuration having the redundant degree of freedom.

Figure 2:
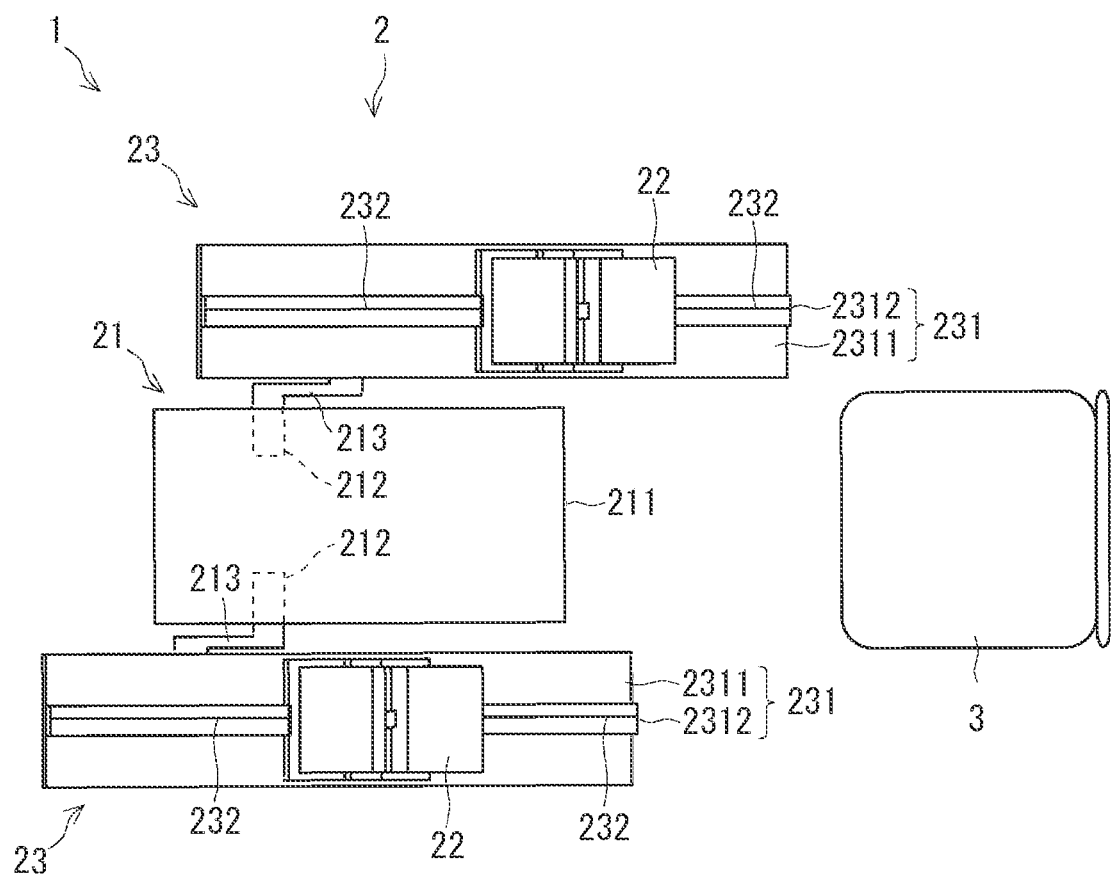
FIG. 2 is a top view of the foot-pedaling exercise apparatus shown in FIG. 1 as viewed from above.

FIG. 1 is a perspective view showing a foot-pedaling exercise apparatus according to the first embodiment. FIG. 2 is a top view of the foot-pedaling exercise apparatus shown in FIG. 1 as viewed from above. A user performs a foot-pedaling exercise in the foot-pedaling exercise apparatus 2 while sitting on a sitting part 3. The disorder detection system 1 according to this embodiment detects a physical disorder of the user related to the output balance between his/her left and right lower legs from a foot-pedaling exercise performed by the user in the foot-pedaling exercise apparatus 2.

The disorder detection system 1 according to the first embodiment includes the foot-pedaling exercise apparatus 2 used for a lower-leg exercise performed by the user, and the sitting part 3 on which the user sits. The sitting part 3 is configured, for example, as a chair on which the user can sit. The sitting part 3 is positioned behind the foot-pedaling exercise apparatus 2. Note that although the sitting part 3 and the foot-pedaling exercise apparatus 2 are configured as separate components, the configuration of the disorder detection system is not limited to this example. That is, the sitting part 3 and the foot-pedaling exercise apparatus 2 may be integrally formed as one apparatus.

The foot-pedaling exercise apparatus 2 is an apparatus for enabling a user to perform a foot-pedaling exercise in a sitting position, and may be in a form including a chair, such as a bicycle, an Aero Bike (Registered Trademark), or a recumbent bike. Note that, in this embodiment, a lower-leg exercise apparatus such as a stepping exercise apparatus having features similar to those described above may be used in place of the foot-pedaling exercise apparatus 2.

As shown in FIGS. 1 and 2, the foot-pedaling exercise apparatus 2 includes a moving mechanism 21, a pair of left and right footrests 22, and a pair of left and right slide mechanisms 23. The moving mechanism 21 includes a pair of left and right shafts 212 rotatably supported in an apparatus main body 211, and a pair of left and right cranks 213 respectively connected to the shafts 212.

Each of the slide mechanisms 23 is connected to a respective one of the cranks 213 through a base part 24. The slide mechanism 23 (i.e., each of the slide mechanisms) includes a guide main part 231.

The tip of the corresponding crank 213 is connected to the front end of the base part 24 in such a manner that the crank 213 can rotate around the pitch axis. A wheel(s) 25 is provided at the rear end of the base part 24 in such a manner that the wheel can rotate around the pitch axis. Typically, the wheel 25 rolls over a floor on which the foot-pedaling exercise apparatus 2 is installed (or placed).

The guide main part 231 extends along the longitudinal direction of the base part 24. The guide main part 231 includes a rail support plate 2311 provided on the base part 24 and a rail 2312 formed on the rail support plate 2311.

The footrests 22 are parts on which the left and right feet of the user are respectively placed. The footrests 22 may be fixed to the outsole of shoes worn by the user by screwing or the like. Further, the footrests 22 may have shapes conforming to the shapes of the soles of the shoes worn by the user.

The footrests 22 are connected to the respective rails 2312 so that they can slide with respect to (i.e., along) the rails 2312. In this way, it is possible to make each of the footrests 22 have a redundant degree of freedom in the front/rear direction.

The slide mechanism 23 further includes a resistance part 232 that applies a resistance to the sliding of the footrest 22. The resistance part 232 is composed of an elastic body 232 such as a rubber tube, a rubber band, or a coil spring. One end of the elastic body 232 is fixed to the front end of the guide main part 231 and the other end thereof is fixed to the rear end of the guide main part 231. That is, the elastic body 232 extends (e.g., is stretched) from the toe end of the footrest 22 to the heel end thereof.

The footrest 22 is connected to the elastic body 232 in such a manner that, for example, the footrest 22 is positioned exactly at the center between the front and rear ends of the guide main part 231 in a state in which the foot of the user is not placed on the footrest 22. When the footrest 22 is moved toward the toe side relative to the guide main part 231 from the above-described neutral state, the elastic body 232 is stretched between the footrest 22 and the rear end of the guide main part 231, so that the footrest 22 is pulled toward the heel side relative to the guide main part 231 by the elastic restoring force of the elastic body 232.

Similarly, when the footrest 22 is moved toward the heel side relative to the guide main part 231 from the above-described neutral state, the elastic body 232 is stretched between the footrest 22 and the front end of the guide main part 231, so that the footrest 22 is pulled toward the toe side relative to the guide main part 231 by the elastic restoring force of the elastic body 232.

Note that the footrest 22 is detachably attached to the elastic body 232. By the above-described configuration, the resistance force applied by the elastic body 232 can be changed according to the direction in which the footrest 22 is moved relative to the guide main part 231.

The apparatus main body 211 includes a reduction gear and a servomotor equipped with an electromagnetic brake (not shown). The servomotor equipped with the electromagnetic brake can rotate the shaft 212 at a predetermined speed or apply a load (e.g., a resistance) to the rotation of the shaft 212.

The left and right shafts 212 are configured to rotate independently of each other. The pair of cranks 213 extend from the outer ends of the respective shafts 212 in directions opposite to each other, which are the directions perpendicular to the longitudinal direction of the shafts 212.

The left and right slide mechanisms 23 and the footrests 22 are configured to move independently of each other. Further, the moving mechanisms 21 rotate the left and right footrests 22 independently of each other in an elliptical trajectory according to the depressing of (i.e., the stepping on) the left and right footrests 22 by the feet of the user. In this way, it is possible to make each of the footrests 22 have a larger redundant degree of freedom. Note that the moving mechanisms 21 may have a configuration in which they rotate the left and right footrests 22 independently of each other in a circular trajectory according to the depressing of (i.e., the stepping on) the left and right footrests 22 by the feet of the user.

By the above-described configuration, the slide mechanisms 23 and the footrests 22 reciprocate forward and backward as the shafts 212 rotate. When the slide mechanisms 23 and the footrests 22 move forward, the front end of the base part 24 passes above the shafts 212. On the other hand, when the slide mechanisms 23 and the footrests 22 move rearward, the front end of the base part 24 passes below the shafts 212.

For example, when the user kicks out his/her right leg forward, the shaft 212 corresponding to the right leg rotates so that the front end of the base part 24 corresponding to the right leg passes above that shaft 212. Next, when the user kicks out his/her left leg forward, the shaft 212 corresponding to the left leg rotates so that the front end of the base part 24 corresponding to the left leg passes above that shaft 212. The user performs an exercise of his/her left and right legs by alternately kicking out the right and left legs forward.

Figure 3:
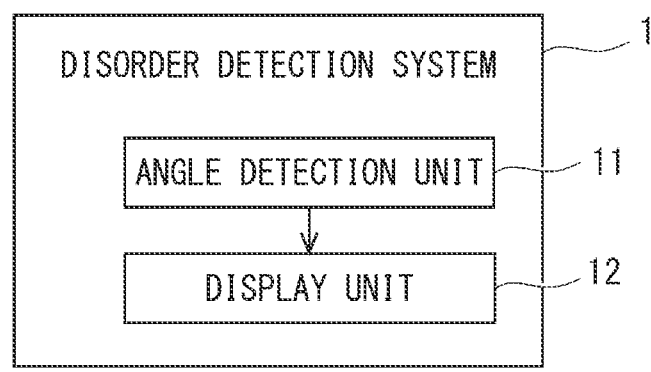
FIG. 3 is a block diagram showing a schematic system configuration of a disorder detection system according to a first embodiment.

FIG. 3 is a block diagram showing a schematic system configuration of a disorder detection system according to the first embodiment. The disorder detection system 1 according to this embodiment includes an angle detection unit 11 that detects the angles of the joints of the left and right lower legs of the user, and a display unit 12 that displays the angles of the joints of the left and right lower legs of the user detected by the angle detection unit 11.

Note that the disorder detection system 1 has a hardware configuration of an ordinary computer including, for example, a processor such as a CPU (Central Processing Unit) or a GPU (Graphics Processing Unit), internal memory such as a RAM (Random Access Memory) or a ROM (Read Only Memory), a storage device such as an HDD (Hard Disk Drive) or an SSD (Solid State Drive), an input/output I/F for connecting peripheral devices such as a display, and a communication I/F for communicating with an apparatus(es) located outside the apparatus (e.g., outside the disorder detection system 1).

The angle detection unit 11 detects each of the angles of the joints of the left and right lower legs of the user around the roll, yaw, and pitch axes while the user is sitting on the sitting part 3 and performing foot-pedaling in the foot-pedaling exercise apparatus 2. The joints of the lower leg include the hip joint, the knee joint, and the ankle joint of the lower leg.

For example, the angle detection unit 11 generates a skeletal model from an image(s) of the hip, knee, and ankle joints of the left and right lower legs taken (e.g., photographed or filmed) by a camera(s), and calculates the angles of the hip, knee, and ankle joints of the left and right lower legs around the roll, yaw, and pitch axes from the generated skeletal model.

Note that the angle detection unit 11 may be formed by posture angle sensors that are arranged across the hip, knee, and ankle joints of the left and right lower legs. The posture angle sensors are, for example, three-degree-of-freedom gyroscopic sensors or three-degree-of-freedom acceleration sensors, and can detect the angles of the hip, knee, and ankle joints of the left and right lower legs around the roll, yaw, and pitch axes.

The display unit 12 displays the angles of the hip, knee, and ankle joints of the left and right lower legs of the user around the roll, yaw, and pitch axes detected by the angle detection unit 11 in a comparative manner. The display unit 12 is formed by a liquid-crystal display, an organic EL (Electro-Luminescence) display, or the like.

Figure 4:
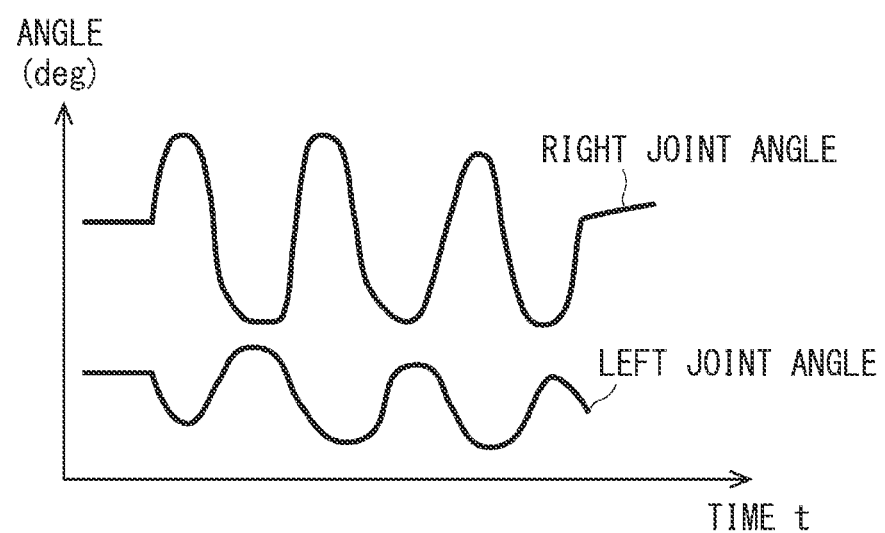
FIG. 4 shows an example of a display showing a left joint angle obtained by adding up the angles of the hip joint, the knee joint, and the ankle joint of a left lower leg around a roll axis, a yaw axis, and a pitch axis, and a right joint angle obtained by adding up the angles of the hip joint, the knee joint, and the ankle joint of a right lower leg around the roll axis, the yaw axis, and the pitch axis in a comparative manner.

As shown in FIG. 4, the display unit 12 displays, for example, a graph of a right joint angle that is obtained by adding up the angles of the hip, knee, and ankle joints of the right lower leg around the roll, yaw, and pitch axes in the upper part of the screen, in which a vertical axis indicates the angle and a horizontal axis indicates the time.

Similarly, the display unit 12 displays a graph of a left joint angle that is obtained by adding up the angles of the hip, knee, and ankle joints of the left lower leg around the roll, yaw, and pitch axes in the lower part of the screen.

Note that the display unit 12 may display the left and right joint angles in the left and right parts, respectively, of the screen, or may display them in a superimposed manner. Further, the display unit 12 may individually display the angles of the hip, knee, and ankle joints of the left and right lower legs of the user around the roll, yaw, and pitch axes in a comparative manner.

In this way, the user or the like can visually recognize a difference between the right joint angle displayed in the upper part and the left joint angle displayed in the lower part, and thereby can easily recognize that the output balance between the left and right lower legs is poor and a physical disorder has occurred in the body. For example, the user or the like can easily recognize one of the left and right lower legs of which the change in the angle is small, i.e., one of the left and right lower legs of which the motion is poor and the output is low. In the case of FIG. 4, it can be easily recognized that the changes in the left joint angle are smaller than those in the right joint angle, and that the motion of the left joint is poor and the output thereof is low.

Note that one of the factors that causes the output balance between the left and right lower legs to deteriorate as described above is a difference in muscular strengths of the left and right lower legs. Further, it is also conceivable that though the left and right muscular strengths are equal to each other, there is at least one of the following factors that may cause a difference in left/right output, i.e., one of the factors: a tissue which is not the muscle but is also used to move the joint is stiffened; the patient feels a pain; and there is a difference between commands provided from the brain (e.g., the patient can move the right lower leg better than the left lower leg because the right lower leg has been more trained than the left lower leg, or a signal from the brain does not reach the muscle). Examples of the difference between commands from the brain include a difference in skillfulness between the left and right lower legs and a difference between the transmissions of signals from the brain to the muscles.

Figure 5:
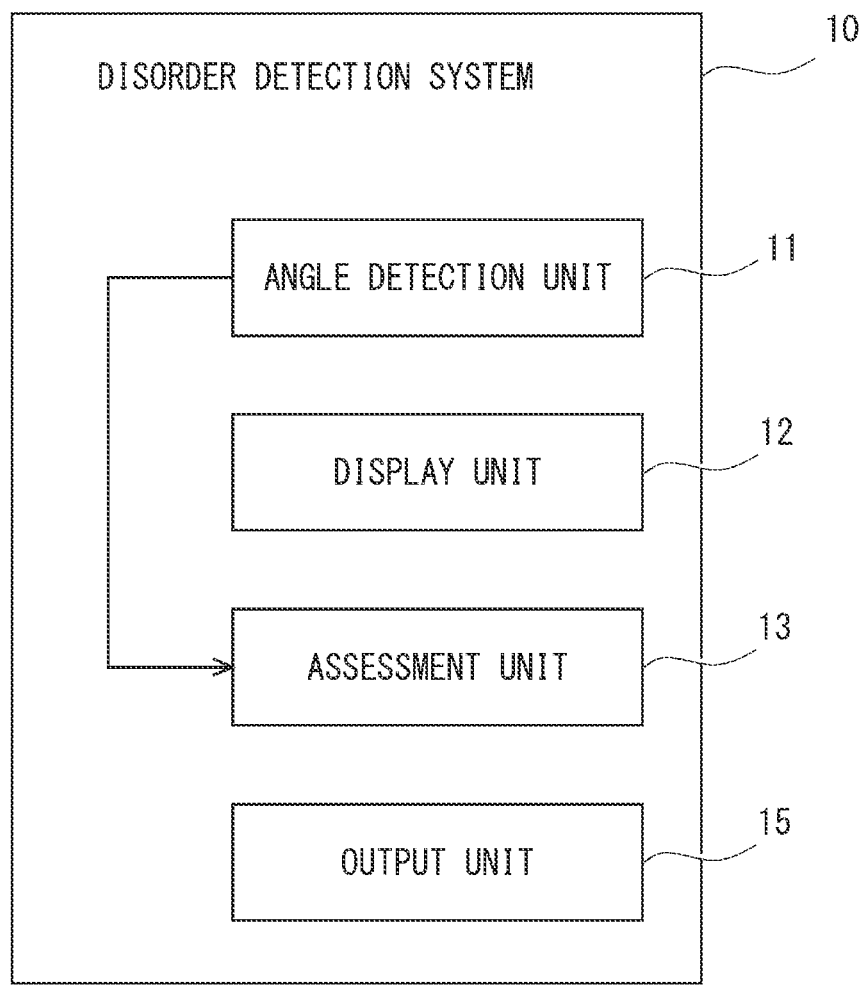
FIG. 5 is a block diagram showing a schematic system configuration of a disorder detection system according to a first embodiment.

Further, the disorder detection system 10 according to this embodiment may further include an assessment unit 13 that assesses the output balance between the left and right lower legs of the user by comparing the angles of the joints of the left and right lower legs of the user around the roll, yaw, and the pitch axes detected by the angle detection unit 11 (FIG. 5).

The assessment unit 13 may assess (i.e., determine) that the output balance between the left and right lower legs of the user is poor when the difference between the sum total of the angles of the joints of the left lower leg of the user around the roll, yaw, and the pitch axes detected by the angle detection unit 11 and the sum total of the angles of the joints of the right lower leg of the user around the roll, yaw, and the pitch axes is equal to or larger than a threshold. By the result of this assessment made by the assessment unit 13, the user or the like can recognize a physical disorder related to the output balance between the left and right lower legs of the user more precisely.

The assessment unit 13 may asses (i.e., determine) that the output balance between the left and right lower legs of the user is poor when the difference between the angles of the joints of the left lower leg of the user around the pitch axis detected by the angle detection unit 11 and the angles of the joints of the right lower leg of the user around the pitch axis is equal to or larger than a threshold.

The reason why attention is paid to the difference between angles around the pitch axis as described above is that most of the movement of the leg of a person is the movement around the pitch axis, so that the difference between the outputs of the left and right lower legs largely appears (e.g., is largely observed) as the difference between the angles around the pitch axis.

Further, the result of the assessment made by the assessment unit 13 may be output to the display unit 12 or an output unit 15 other than the display unit 12.

Figure 6:
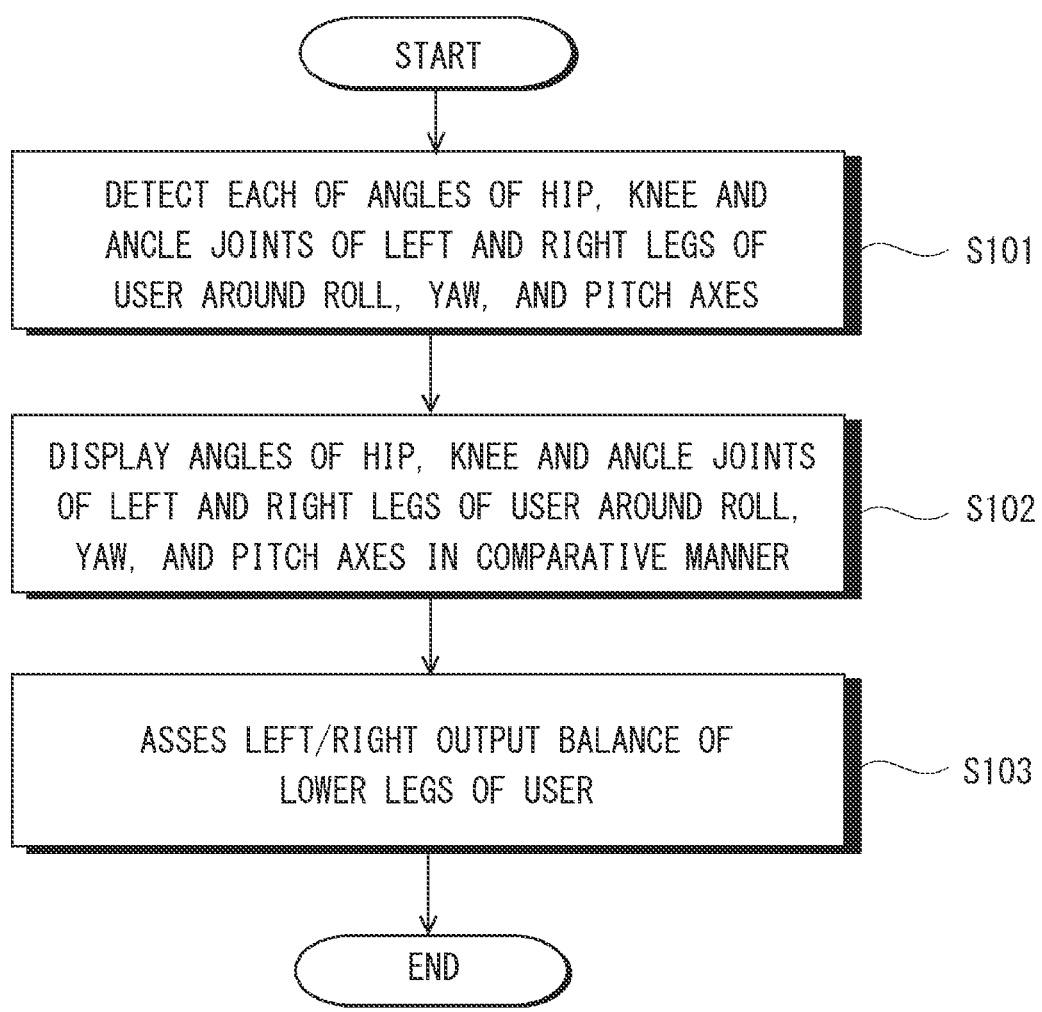
FIG. 6 is a flowchart showing a flow of a disorder detection method according to the first embodiment.

Next, a disorder detection method according to the first embodiment will be described. FIG. 6 is a flowchart showing a flow of the disorder detection method according to the first embodiment.

The angle detection unit 11 detects each of the angles of the hip, knee, and ankle joints of the left and right lower legs of the user around the roll, yaw, and pitch axes while the user is performing foot-pedaling in the foot-pedaling exercise apparatus 2 (Step S101).

The display unit 12 displays the angles of the hip, knee, and ankle joints of the left and right lower legs of the user around the roll, yaw, and pitch axes detected by the angle detection unit 11 in a comparative manner (Step S102).

The assessment unit 13 assesses the output balance between the left and right lower legs of the user by comparing the angles of the hip, knee, and ankle joints of the left and right lower legs of the user around the roll, yaw, and pitch axes detected by the angle detection unit 11 (Step S103).

As described above, the disorder detection system 1 according to the first embodiment includes: a pair of left and right footrests 22 configured so that left and right feet of a user are respectively placed thereon, and the user performs an exercise of his/her legs therewith; a pair of left and right slide mechanisms 23 configured to enable the footrests 22 to slide in a front/rear direction with respect to a sitting part 3, the pair of left and right slide mechanisms 23 including a resistance part 232 configured to apply a resistance to the sliding; a moving mechanism 21 configured to enable the left and right slide mechanisms 23 and the footrests 22 to move independently of each other; an angle detection unit 11 configured to detect angles of joints of left and right lower legs of the user around a roll axis, a yaw axis, and a pitch axis; and a display unit 12 configured to display the detected angles of the joints of the left and right lower legs of the user around the roll, yaw, and pitch axes detected by the angle detection unit 11.

According to the first embodiment, attention is paid to a characteristic of a person that he/she tends to move one of two counterpart body parts (e.g., a pair of legs) that he/she can move more easily than the other more widely due to a kinematic chain. Further, the disorder detection system is configured so that the left and right footrests 22 can move independently or each other, and the footrests 22 can slide freely forward and backward, so that the disorder detection system has a larger redundant degree of freedom. In this way, the user can visually recognize a difference between the right joint angle and the left joint angle displayed in the display unit 12, and he/she can easily recognize that the output balance of the lower left and right lower legs is poor, and that a physical disorder has occurred in his/her body.

Second Embodiment

Figure 7:
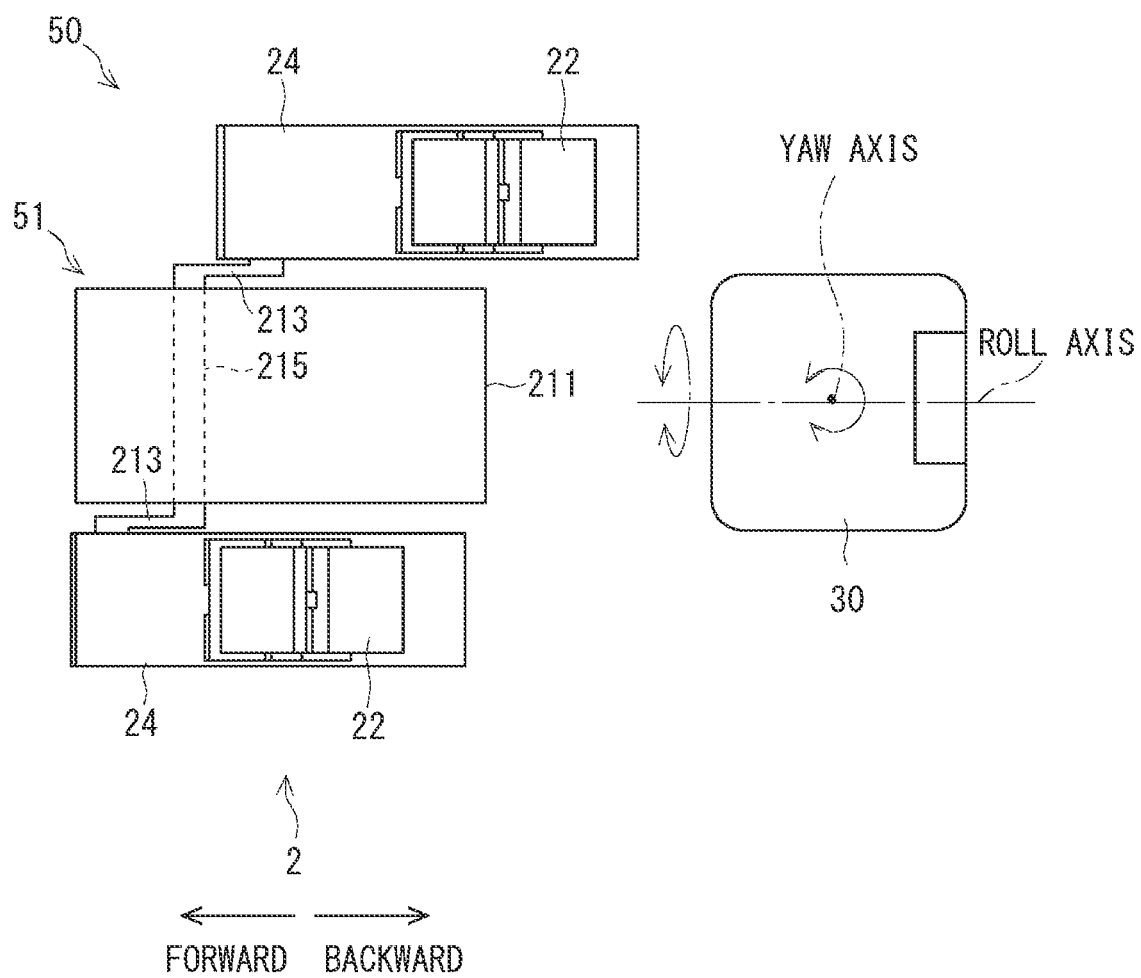
FIG. 7 is a top view of a foot-pedaling exercise apparatus according to a second embodiment as viewed from above.

A second embodiment uses a characteristic that, of the left and right sides of the body of a user, the mobility of the body on the side opposite to the side toward which the center of gravity of the body is shifted is better than the mobility on the other side. That is, in the second embodiment, a physical disorder of a user related to his/her left/right balance is detected by using this characteristic. FIG. 7 is a top view of a foot-pedaling exercise apparatus according to the second embodiment as viewed from above.

In the second embodiment, a sitting part 30 is rotatable around the roll axis, and it is detected whether the trunk of a user is out of balance by using a characteristic that when the center of gravity of the body of the user is shifted, the body of the user is inclined toward the side to which the center of gravity of the body is shifted.

Note that when a user performs a foot-pedaling exercise while sitting on the sitting part 30 that is rotatable around the roll axis as described above, there will be a side on which the user needs to try hard to stretch his/her leg when he/she performs the foot-pedaling. In this case, it is necessary to make the sitting part 30 rotatable around the yaw axis as well as the roll axis so that the user can perform the foot-pedaling by stretching the leg while rotating the hip joint.

Further, it is difficult to perform a foot-pedaling exercise by moving the left and right footrests 22 independently of each other in an unstable state, i.e., in a state in which the sitting part 30 can rotate around the roll and yaw axes as described above. Therefore, a moving mechanism 51 makes the left and right footrests 22 move in a linked manner. For example, as shown in FIG. 7, the left and right shafts 215 are connected to each other directly or through a gear(s). Further, the slide mechanisms 23 for making the footrests 22 slide are not used, and the footrests 22 are fixed to the base parts 24 and hence does not slide.

As described above, the disorder detection system 20 according to the second embodiment has a configuration roughly the same as that of the disorder detection system 1 according to the first embodiment. However, the second embodiment differs from the above-described first embodiment in that: the sitting part 30 is configured to be rotatable around the roll and yaw axes; the moving mechanism 51 makes the left and right footrests 22 move in a linked manner; and the slide mechanisms 23 are not used.

Note that, in the second embodiment, the same reference numerals (or symbols) as those in the first embodiment are assigned to the same components/structures as those in the first embodiment, and the detailed descriptions thereof are omitted.

A foot-pedaling exercise apparatus 50 according to the second embodiment is substantially identical to the foot-pedaling exercise apparatus 2 according to the above-described first embodiment. However, the foot-pedaling exercise apparatus 50 according to the second embodiment does not use the slide mechanisms 23 as described above, and the footrests 22 are directly supported by the cranks 213 through the base part 24. Further, the left and right shafts 215 are directly connected to each other.

Figure 8:
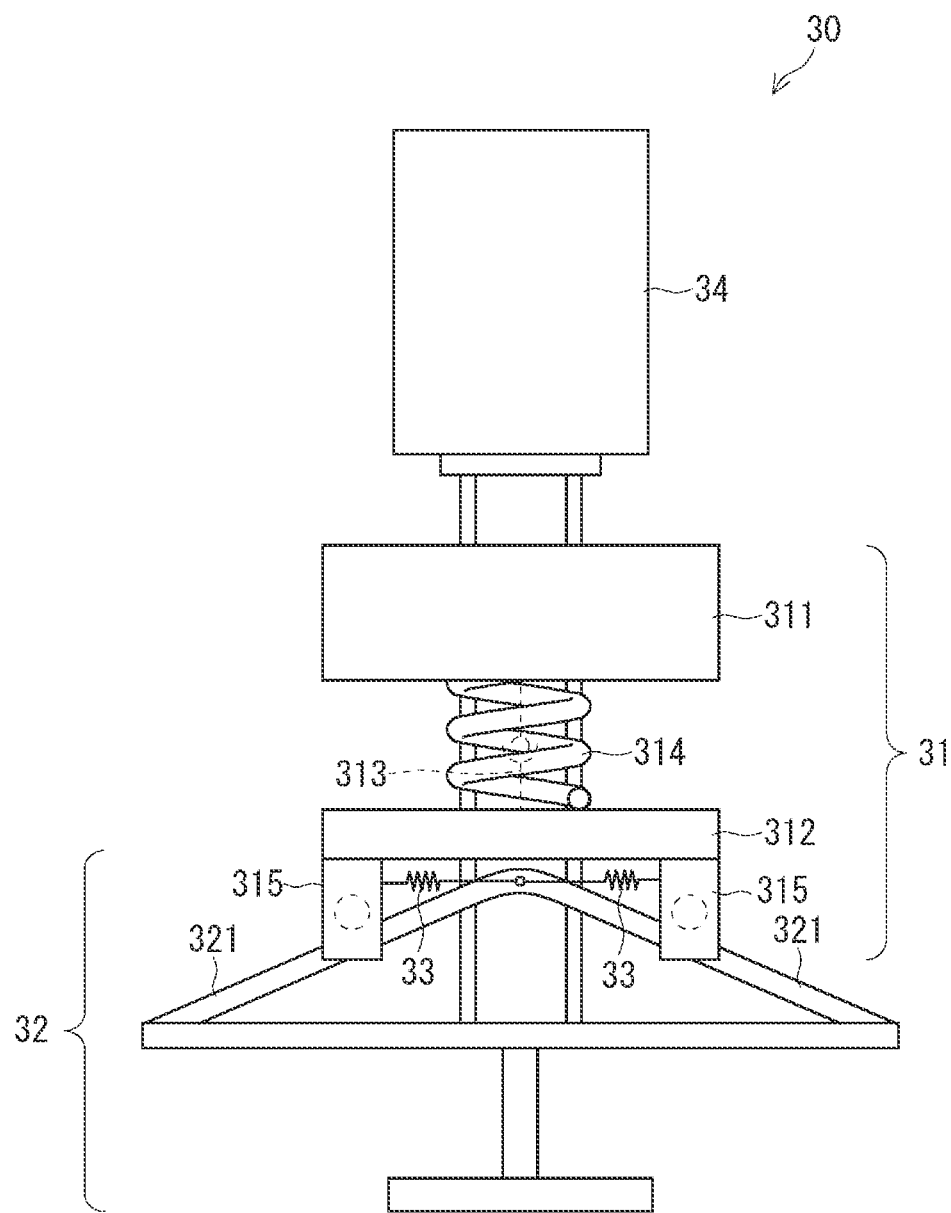
FIG. 8 shows a front view of an example of a sitting part according to the second embodiment.

FIG. 8 shows a front view of an example of a sitting part according to the second embodiment. The seat part 311 of the sitting part 30 is configured to be rotatable around the roll and yaw axes. In this way, a kinematic chain between the lower legs and the trunk is effectively formed during the foot-pedaling exercise.

For example, when a person performs a foot-pedaling exercise while sitting on an ordinary chair, his/her hip joint does not move. Therefore, the hip joint does not rotate, and are neither bent nor stretched. In contrast, by configuring the disorder detection system so that the seat part is rotatable around the roll and yaw axes, and it has a degree of freedom for the left/right swinging in the roll-axis direction and for the left/right rotation in the yaw-axis direction, it is possible to form a kinematic chain of the hip joint as the user performs a foot-pedaling exercise.

As shown in FIG. 8, the sitting part 30 includes a movable unit 31, a support unit 32, a restoration unit 33, and a backrest 34. The movable unit 31 includes a seat part 311 on which a user sits. The support unit 32 supports the movable unit 31 in such a manner that the movable unit 31 can move to the left and right.

The restoration unit 33 applies a force so that the movable unit 31 is pressed or pulled toward a neutral position in the left/right direction. The support unit 32 supports the movable unit 31 in such a manner that the movable unit 31 descends as the movable unit 31 moves away from the neutral position. The support unit 32 includes two rails 321.

Each of the rails 321 defines a trajectory of the movement of the movable unit 31 in the left/right direction. Each of the rails 321 is bent so as to project upward. In this way, each of the rails 321 supports the movable unit 31 so that the movable unit 31 can rotate around the roll axis.

The movable unit 31 includes the seat part 311, a movable unit main part 312, a universal joint 313, a coil spring 314, and a pair of connection units 315.

The pair of connection units 315, the movable unit main part 312, and the seat part 311 are arranged in this order in the direction receding from the floor surface. The universal joint 313 and the coil spring 314 are disposed between the movable unit main part 312 and the seat part 311. The pair of connection units 315 are disposed on the lower surface (i.e., the underside) of the movable unit main part 312. The connection units 315 are slidably connected to the rails 321.

The seat part 311 and the movable unit main part 312 are connected to each other through the universal joint 313. Therefore, the seat part 311 is supported by the movable unit main part 312 so that the seat part 311 can rotate around the yaw axis.

As described above, the seat part 311 is configured so that the seat part 311 is, in addition being rotatable around the roll axis by the movable unit main part 312 and the support unit 32, also rotatable around the yaw axis by the universal joint 313. Note that the above-described configuration of the sitting part 30 is merely an example, and it is not limited to this example. That is, the sitting part 30 may have any configuration as long as the seat part 311 is rotatable around the roll and yaw axes.

In the second embodiment, a user performs a foot-pedaling exercise in the foot-pedaling exercise apparatus 50 while sitting on the sitting part 30, which is rotatable around the roll and yaw axes.

The angle detection unit 11 detects the angles of the hip, knee, and ankle joints of the left and right lower legs of the user around the roll, yaw, and pitch axes while the user is sitting on the sitting part 30, which is rotatable around the roll and yaw axes, and performing a foot-pedaling exercise in the foot-pedaling exercise apparatus 50.

The display unit 12 may display a left joint angle that is obtained by adding up the angles of the hip, knee, and ankle joints of the left lower leg of the user around the roll, yaw, and pitch axes detected by the angle detection unit 11, and a right joint angle that is obtained by adding up the angles of the hip, knee, and ankle joints of the right lower leg of the user around the roll, yaw, and pitch axes in a comparative manner. In this way, the user or the like can visually recognize a difference between the right joint angle and the left joint angle, and he/she can easily recognize that a physical disorder, such as an imbalance between the left and right sides of the trunk of the user, has occurred in the body of the user.

The display unit 12 may display the left joint angle obtained by adding up the angles of the hip, knee, and ankle joints of the left lower leg around the roll, yaw, and pitch axes, and the right joint angle obtained by adding up the angles of the hip, knee, and ankle joints of the right lower leg around the roll, yaw, and pitch axes in the upper part and the lower part, respectively, of the screen, or in the left part and the right part, respectively, of the screen in a comparative manner.

Alternatively, the display unit 12 may display each of the left joint angle obtained by adding up the angles of the hip, knee, and ankle joints of the left lower leg around the roll, yaw, and pitch axes, and the right joint angle obtained by adding up the angles of the hip, knee, and ankle joints of the right lower leg around the roll, yaw, and pitch axes in a superimposed and comparative manner.

In the case where the sitting part 30 is configured to be rotatable around the roll axis and swings in the left/right direction as described above, in such a dynamic balance state, there will be a strong side and a weak side due to the difference between the left and right sides of the trunk. One of the possible causes for the weak side is that, for example, the muscular strength of a user or the like is weak and hence it is difficult for him/her to make the most of his/her muscular performance ability.

For example, when the right joint angle is generally larger than the left joint angle, it is considered that the center of gravity of the trunk of the user is shifted to the left side of the user, and that the distance between the user and the right footrest 22 has increased because the sitting part 30 has swung to the left side, so that the foot-pedaling motion performed by the right leg has increased.

As described above, the user or the like can visually recognize a difference between the right joint angle and the left joint angle through the comparative display by the display unit 12, and he/she can easily recognize an imbalance between the left/right sides of the trunk of the user.

The assessment unit 13 assesses whether the trunk of the user is out of balance based on the difference between the sum totals of the angles of the hip, knee, and ankle joints of the left and right lower legs of the user around the roll, yaw, and pitch axes detected by the angle detection unit 11. In this way, it is possible to easily assess an imbalance between the left and right sides of the trunk of the user by using the characteristic that the mobility of the body of the user on the side opposite to the side toward which the center of gravity of the body is shifted is better than the mobility on the other side.

For example, when the assessment unit 13 determines that the sum totals of the angles of the hip, knee, and ankle joints of the left lower leg of the user around the roll, yaw, and pitch axes detected by the angle detection unit 11 are respectively larger than the sum totals of the angles of the hip, knee, and ankle joints of the right lower leg around the roll, yaw, and pitch axes, it may assess (i.e., determine) that the trunk of the user is out of balance.

When the assessment unit 13 determines that the sum total of the angles of the hip, knee, and ankle joints of the left lower leg of the user around the roll, yaw, and pitch axes detected by the angle detection unit 11 is smaller than the sum total of the angles of the hip, knee, and ankle joints of the right lower leg around the roll, yaw, and pitch axes, it may assess (i.e., determine) that the trunk of the user is out of balance.

When the assessment unit 13 determines that the sum total of the angles of the hip, knee, and ankle joints of the left lower leg of the user around the roll, yaw, and pitch axes detected by the angle detection unit 11 is larger than the sum total of the angles of the hip, knee, and ankle joints of the right lower leg around the roll, yaw, and pitch axes, it may assess (i.e., determine) that the trunk of the user is inclined to the right and his/her sitting load balance is also off to the right.

When the assessment unit 13 determines that the sum total of the angles of the hip, knee, and ankle joints of the right lower leg of the user around the roll, yaw, and pitch axes detected by the angle detection unit 11 is larger than the sum total of the angles of the hip, knee, and ankle joints of the left lower leg around the roll, yaw, and pitch axes, it may assess (i.e., determine) that the trunk of the user is inclined to the left and his/her sitting load balance is also off to the left.

As descried above, by configuring the sitting part 30 to be rotatable around the roll and yaw axes, and using the characteristic that the mobility of the body on the side opposite to the side toward which the center of gravity of the body is shifted is better than the mobility on the other side, it is possible to easily assess whether the trunk of the user is out of balance.

Note that the assessment unit 13 may assess whether the trunk of the user is out of balance by comparing the angles of the hip, knee, and ankle joints of the left and right lower legs of the user around the pitch axis detected by the angle detection unit 11. This is because most of the movement of the leg of a person is the movement around the pitch axis, so that the difference between the outputs of the left and right lower legs largely appears (e.g., is largely observed) as the difference between the angles around the pitch axis.

For example, when the assessment unit 13 determines that the angles of the hip, knee, and ankle joints of the left lower leg of the user around the pitch axis detected by the angle detection unit 11 are larger than the angles of the hip, knee, and ankle joints, respectively, of the right lower leg around the pitch axis, it may assess (i.e., determine) that the trunk of the user is out of balance.

Similarly, when assessment unit 13 determines that the angles of the hip, knee, and ankle joints of the left lower leg of the user around the pitch axis detected by the angle detection unit 11 are larger than the angles of the hip, knee, and ankle joints of the right lower leg of the user around the pitch axis, it may assess (i.e., determine) that the trunk of the user is inclined to the right and his/her sitting load balance is also off to the right.

As described above, the disorder detection system 20 according to the second embodiment includes: a sitting part 30 configured to enable a user to sit thereon and rotate around a roll axis and a yaw axis; a pair of left and right footrests 22 configured so that left and right feet of the user are respectively placed thereon, and the user performs an exercise of his/her legs therewith; a moving mechanism 51 configured to enable the left and right footrests 22 to move in a linked manner; an angle detection unit 11 configured to detect angles of joints of left and right lower legs of the user around a roll axis, a yaw axis, and a pitch axis; and a display unit 12 configured to display the detected angles of the joints of the left and right lower legs of the user around the roll, yaw, and pitch axes detected by the angle detection unit 11.

According to the second embodiment, attention is paid to the characteristic that the mobility of the body of the user on the side opposite to the side toward which the center of gravity of the body is shifted is better than the mobility on the other side, and the sitting part 30 is configured to be rotatable around the roll and yaw axes. In this way, when the center of gravity of the body of the user is shifted, the body of the user is inclined toward the side to which the center of gravity of the body of the user is shifted. In this way, the user can visually recognize this inclination as a difference between the right and left joint angles displayed on the display unit 12, easily recognize an imbalance between the left and right sides of the trunk of the user, and easily detect a physical disorder related to the left/right balance.

Third Embodiment

In a third embodiment, a physical disorder of a user related to his/her left/right balance is detected by using a characteristic that when there is a problem in regard to the stiffness of the muscle in a joint, a defect occurs in the link of the kinematic chain and the motion of the joint becomes slower.

When the motion of the kinematic chain of the lumbar vertebra, hip joint, knee joint, and ankle joint are observed, it is more desirable that the body, which is moved by using a foot-pedaling exercise apparatus, is not fixed to any object or the like and hence the motion thereof is not constrained.

For example, by configuring the sitting part 30 so that it is rotatable around the roll and yaw axes, and it has a degree of freedom for the left/right swinging in the roll-axis direction and for the left/right rotation in the yaw-axis direction as described above, a kinematic chain of the hip joint is formed as the user performs a foot-pedaling exercise. Further, in order to transfer this kinematic chain to the foot, the footrest needs to have mechanistic degrees of freedom including degrees of freedom in the plantarflexion and dorsiflexion directions, degrees of freedom in the pronation and supination directions, and degrees of freedom in abduction and adduction.

To that end, a disorder detection system according to the third embodiment has a configuration roughly identical to that of the disorder detection system according to the above-described second embodiment. However, the third embodiment differs from the above-described second embodiment in that the footrests are configured to be rotatable around the roll, yaw, and pitch axes. In this way, in the third embodiment, by adopting a configuration in which the degrees of freedom of the motions of the joints of the feet are less restricted than in the above-described second embodiment, so that it is possible to reliably transfer the kinematic chain formed in the hip joint as a result of a foot-pedaling exercise to the foot.

Note that, in the third embodiment, the same reference numerals (or symbols) as those in the first and second embodiments are assigned to the same components/structures as those in the first and second embodiments, and the detailed descriptions thereof are omitted.

Figure 9:
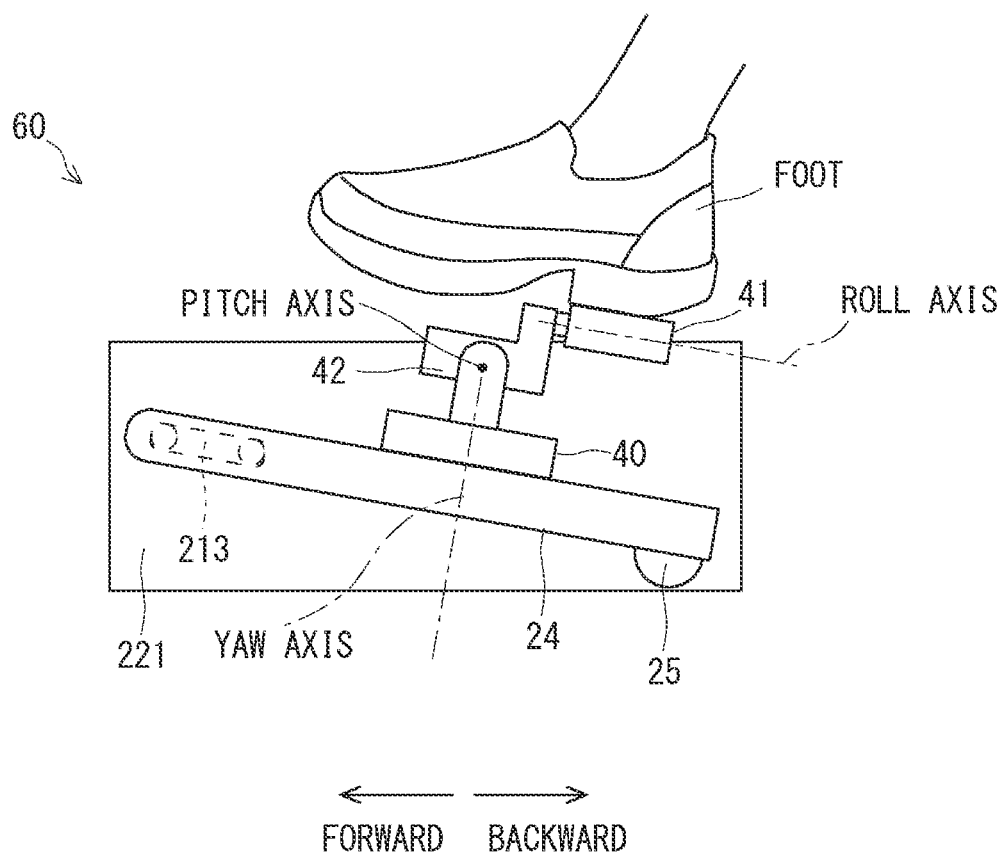
FIG. 9 shows an example of a configuration for enabling a footrest to rotate around a roll axis, a yaw axis, and a pitch axis.

FIG. 9 shows an example of a configuration for enabling a footrest to rotate around the roll, yaw, and pitch axes. A fixed part 40 is fixed to a base part 24. A joint part 42 is provided between a footrest 41 and the fixed part 40.

The joint part 42 connects the footrest 41 and the fixed part 40 so that the footrest 41 is rotatable around the pitch, roll, and yaw axes relative to the fixed part 40. The footrest 41 may be fixed to the outsole of a shoe worn by a user by screwing or the like. Note that FIG. 9 shows the left side of a foot-pedaling exercise apparatus 60, and the right side thereof has a configuration similar to that on the left side.

By the above-described configuration, it is possible to realize mechanistic degrees of freedom of the footrest 41 that has, when the user performs a lower-leg exercise, degrees of freedom in the plantarflexion and dorsiflexion directions, degrees of freedom in the pronation and supination directions, and degrees of freedom in abduction and adduction. Note that the above-described configuration is merely an example, and is not limited to this example. That is, the footrest may have any configuration as long as the footrest 41 is rotatable around the roll, yaw, and pitch axes.

In the third embodiment, as described above, a user performs a foot-pedaling exercise by depressing (i.e., stepping on) the footrests 41, which is rotatable around the roll, yaw, and pitch axes, in the foot-pedaling exercise apparatus 60 while sitting on the sitting part 30, which is rotatable around the roll and yaw axes.

Figure 10:
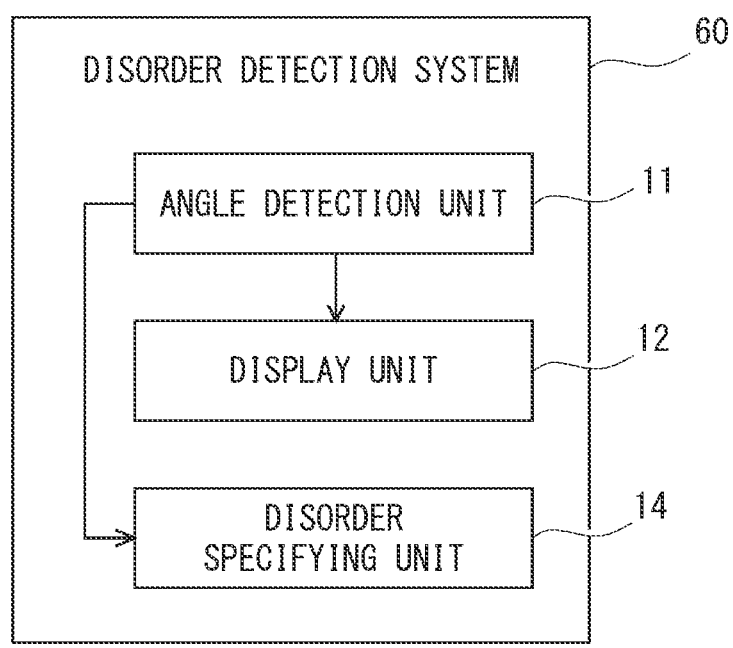
FIG. 10 is a block diagram showing a schematic system configuration of a disorder detection system according to a third embodiment.

FIG. 10 is a block diagram showing a schematic system configuration of a disorder detection system according to the third embodiment. The disorder detection system 60 according to the third embodiment may include a disorder specifying unit 14 in place of the assessment unit 13 according to the above-described second embodiment.

The angle detection unit 11 detects the angles of the hip, knee, and ankle joints of the left and right lower legs of the user around the roll, yaw, and pitch axes while the user is sitting on the sitting part 30, which is rotatable around the roll and yaw axes, and performing a foot-pedaling exercise by depressing (i.e., stepping on) the footrests 41, which is rotatable around the roll, yaw, and pitch axes, in the foot-pedaling exercise apparatus.

The display unit 12 displays display, in a comparative manner, the sum total of the angles of the hip joint of the left lower leg of the user around the roll, yaw, and pitch axes detected by the angle detection unit 11, the sum total of the angles of the knee joint of the left lower leg around the roll, yaw, and pitch axes, and the sum total of the angles of the ankle joint of the left lower leg around the roll, yaw, and pitch axes; and the sum total of the angles of the hip joint of the right lower leg around the roll, yaw, and pitch axes, the sum total of the angles of a knee joint of the right lower leg around the roll, yaw, and pitch axes, and the sum total of the angles of an ankle joint of the right lower leg around the roll, yaw, and pitch axes.

Figure 11:
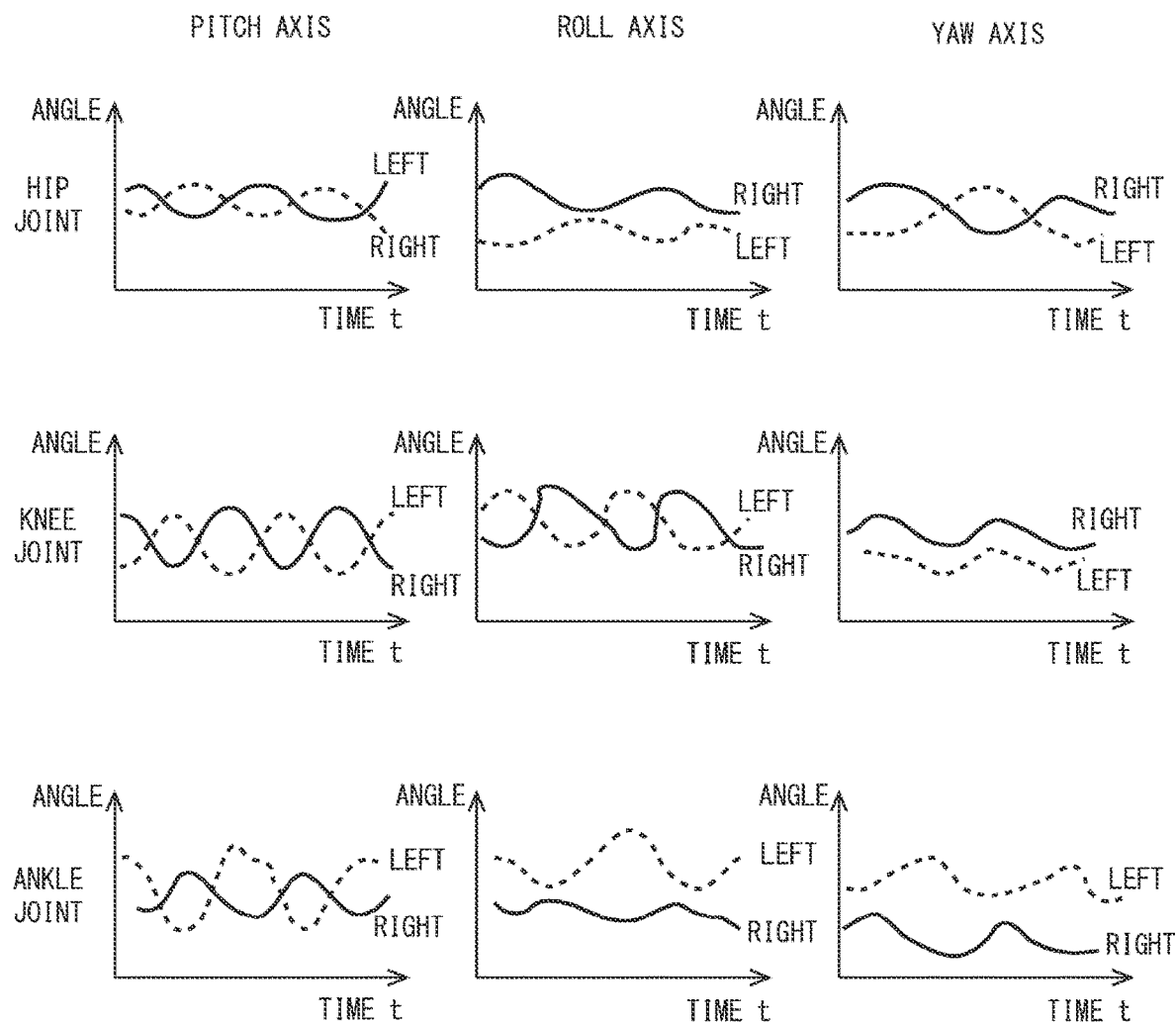
FIG. 11 shows examples of displays showing the angles of hip joints, knee joints, and ankle joints of left and right lower legs around a roll axis, a yaw axis, and a pitch axis in a comparative manner.

Further, as shown in FIG. 11, the display unit 12 may individually display the angles of the hip joints of the left and right lower legs around each of the roll, yaw, and pitch axes, the angles of the knee joints of the left and right lower legs around each of the roll, yaw, and pitch axes, and the angles of the ankle joints of the left and right lower legs around each of the roll, yaw, and pitch axes.

As described above, the user or the like can visually recognize a difference between the right joint angle and the left joint angle through the comparative display by the display unit 12, and he/she can easily recognize a physically disordered part of the user.

For example, the user or the like compares the angles of the hip, knee, and ankle joints of the left and right lower legs of the user around the roll, yaw, and pitch axes displayed on the display unit 12. Note that, among the hip, knee, and ankle joints, for a joint of which the motion is poor, a difference between the left and right sides occurs. Therefore, the user or the like can easily specify the joint of which the difference between the left and right sides has occurred as a disordered part.

The disorder specifying unit 14 specifies a physically disordered part of the user based on differences between the sum total of the angles of the hip joint of the left lower leg of the user around the roll, yaw, and pitch axes detected by the angle detection unit 11, the sum total of the angles of the knee joint of the left lower leg around the roll, yaw, and pitch axes, and the sum total of the angles of the ankle joint of the left lower leg around the roll, yaw, and pitch axes, and the sum total of the angles of the hip joint of the right lower leg around the roll, yaw, and pitch axes, the sum total of the angles of the knee joint of the right lower leg around the roll, yaw, and pitch axes, and the sum total of angles of the ankle joint of the right lower leg around the roll, yaw, and pitch axes, respectively. In this way, the user or the like can easily specify a physical disorder of the user related to the left/right balance of the user.

The disorder specifying unit 14 may specify, as the disordered part, at least one of a pair of hip joints, a pair of knee joints, and a pair of ankle joints of the left and right lower legs of the user of which an angular difference between the sum total of the angles of the joint of the left lower leg around the roll, yaw, and pitch axes detected by the angle detection unit 11 and the sum total of the angles of the joint of the right lower leg around the roll, yaw, and pitch axes is equal to or larger than a threshold. In this way, the user or the like can easily specify a joint of which the angular difference between the left and right joints (i.e., between the joint and its counterpart joint) is larger than a threshold as a disordered part.

Further, the result of the specification by the disorder specifying unit 14 may be output to the display unit 12 or other output units.

As described above, the foot-pedaling exercise apparatus 60 according to the third embodiment includes: a sitting part 30 configured to enable a user to sit thereon and rotate around a roll axis and a yaw axis; a pair of left and right footrests 41 configured so that left and right feet of the user are respectively placed thereon and can rotate around the roll, yaw, and pitch axes, the pair of left and right footrests 41 being further configured to enable the user performs an exercise of his/her legs therewith; a moving mechanism 51 configured to enable the left and right footrests 41 to move in a linked manner; an angle detection unit 11 configured to detect angles of joints of left and right lower legs of the user around a roll axis, a yaw axis, and a pitch axis; and a display unit 12 configured to display the detected angles of the joints of the left and right lower legs of the user around the roll, yaw, and pitch axes detected by the angle detection unit 11.

According to the third embodiment, attention is paid to the characteristic that when there is a problem in regard to the stiffness of the muscle in a joint, a defect occurs in the link of the kinematic chain and the motion of the joint becomes slower, and the sitting part 30 is configured to be rotatable around the roll and yaw axes. Further, the footrests 41 are configured to be rotatable around the roll, yaw, and pitch axes. By the above-described configuration, it is possible to eliminate the constraint on the motion of the kinematic chain of the hip, knee, and ankle joints, and thereby to reliably form the kinematic chain. In this way, the user can visually recognize, among the hip, knee, and ankle joints, a joint of which the motion is poor as a difference between the right and left joint angles displayed on the display unit 12, and easily detect the joint for which the difference has occurred as a physically disordered part of the user.

Several embodiments according to the present disclosure have been described above. However, these embodiments are shown as examples but are not shown to limit the scope of the disclosure. These novel embodiments can be implemented in various forms. Further, their components/structures may be omitted, replaced, or modified without departing from the scope of the disclosure. These embodiments and their modifications are included in the scope of the disclosure, and included in the scope as specified in the claims.

The present disclosure can also be implemented, for example, by carrying out the processes shown in FIG. 6 by having a processor execute a computer program(s).

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, and RAM (Random Access Memory)).

The program may be provided to a computer using any type of transitory computer readable media. Examples of transitory computer readable media include electric signals, optical signals, and electromagnetic waves. Transitory computer readable media can provide the program to a computer through a wired communication line (e.g., electric wires, and optical fibers) or a wireless communication line.

Each of the components constituting the disorder detection systems according to the above-described embodiments is, in addition to being able to be implemented by the program, able to be partially or entirely implemented by dedicated hardware such as an ASIC (Application Specific Integrated Circuit) or an FPGA (Field-Programmable Gate Array).

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A disorder detection system comprising:
a sitting part configured to enable a user to sit thereon and rotate around a roll axis and a yaw axis;
a pair of left and right footrests configured so that left and right feet of the user are respectively placed thereon, the pair of left and right footrests being configured for the user to perform an exercise of his/her legs;
a moving mechanism having a pair of left and right shafts rotatably supported in a main body and a pair of left and right cranks respectively connected to the pair of left and right shafts, the moving mechanism configured to enable the left and right footrests to move in a linked manner;
an angle detection sensor configured to detect angles of joints of left and right lower legs of the user around a roll axis, a yaw axis, and a pitch axis; and
a display unit configured to display the detected angles of the joints of the left and right lower legs of the user around the roll, yaw, and pitch axes detected by the angle detection sensor.

2. The disorder detection system according to claim 1, wherein the display unit displays a sum total of the angles of the joints of the left lower leg of the user around the roll, yaw, and pitch axes and a sum total of those of the right lower leg of the user around the same in a comparative manner.

3. The disorder detection system according to claim 1, further comprising a processor configured to assess whether a trunk of the user is out of balance by comparing a sum total of the angles of the joints of the left lower leg of the user around the roll, yaw, and pitch axes and the sum total of those of the right lower leg of the user around the same detected by the angle detection sensor.

4. The disorder detection system according to claim 3, wherein the processor assesses that the trunk of the user is out of balance when it has determined that the sum total of the angles of the joints of the left lower leg of the user around the roll, yaw, and pitch axes detected by the angle detection sensor is larger than the sum total of the angles of the joints of the right lower leg around the roll, yaw, and pitch axes, or when it has determined that the sum total of the angles of the joints of the left lower leg of the user around the roll, yaw, and pitch axes is smaller than the sum total of the angles of the joints of the right lower leg around the roll, yaw, and pitch axes.

5. The disorder detection system according to claim 3, wherein
the processor assesses that the trunk of the user is inclined to the right and his/her sitting load balance is also off to the right when it has determined that the sum total of the angles of the joints of the left lower leg of the user around the roll, yaw, and pitch axes detected by the angle detection sensor is larger than the sum total of the angles of the joints of the right lower leg around the roll, yaw, and pitch axes, and
the processor assesses that the trunk of the user is inclined to the left and his/her sitting load balance is also off to the left when it has determined that the sum total of the angles of the joints of the right lower leg of the user around the roll, yaw, and pitch axes is larger than the sum total of the angles of the joints of the left lower leg around the roll, yaw, and pitch axes.

6. A disorder detection method for a disorder detection system,
the disorder detection system comprising:
a sitting part configured to enable a user to sit thereon and rotate around a roll axis and a yaw axis;
a pair of left and right footrests configured so that left and right feet of the user are respectively placed thereon, the pair of left and right footrests being configured for the user to perform an exercise of his/her legs;
a moving mechanism having a pair of left and right shafts rotatably supported in a main body and a pair of left and right cranks respectively connected to the pair of left and right shafts, the moving mechanism configured to enable the left and right footrests to move in a linked manner,
the disorder detection method comprising:
detecting angles of joints of left and right lower legs of the user around a roll axis, a yaw axis, and a pitch axis; and
displaying the detected angles of the joints of the left and right lower legs of the user around the roll, yaw, and pitch axes.

7. A non-transitory computer readable medium storing a program for a disorder detection system,
the disorder detection system comprising:
a sitting part configured to enable a user to sit thereon and rotate around a roll axis and a yaw axis;
a pair of left and right footrests configured so that left and right feet of the user are respectively placed thereon, the pair of left and right footrests being configured for the user to perform an exercise of his/her legs; and
a moving mechanism having a pair of left and right shafts rotatably supported in a main body and a pair of left and right cranks respectively connected to the pair of left and right shafts, the moving mechanism configured to enable the left and right footrests to move in a linked manner,
the program being adapted to cause a computer to perform:
a process for detecting angles of joints of left and right lower legs of the user around a roll axis, a yaw axis, and a pitch axis; and
a process for displaying the detected angles of the joints of the left and right lower legs of the user around the roll, yaw, and pitch axes.

8. A disorder detection system comprising:
a sitting part configured to enable a user to sit thereon and rotate around a roll axis and a yaw axis;
a pair of left and right footrests configured so that left and right feet of the user are respectively placed thereon and can rotate around the roll, yaw, and pitch axes, the pair of left and right footrests being configured for the user to perform an exercise of his/her legs therewith;
a moving mechanism having a pair of left and right shafts rotatably supported in a main body and a pair of left and right cranks respectively connected to the pair of left and right shafts, the moving mechanism configured to enable the left and right footrests to move in a linked manner;
an angle detection sensor configured to detect angles of joints of left and right lower legs of the user around a roll axis, a yaw axis, and a pitch axis; and
a display unit configured to display the detected angles of the joints of the left and right lower legs of the user around the roll, yaw, and pitch axes detected by the angle detection sensor.

9. The disorder detection system according to claim 8, wherein the display unit displays, in a comparative manner,
a sum total of angles of a hip joint of the left lower leg of the user around the roll, yaw, and pitch axes detected by the angle detection sensor, a sum total of angles of a knee joint of the left lower leg around the roll, yaw, and pitch axes, and a sum total of angles of an ankle joint of the left lower leg around the roll, yaw, and pitch axes, and
a sum total of angles of a hip joint of the right lower leg around the roll, yaw, and pitch axes, a sum total of angles of a knee joint of the right lower leg around the roll, yaw, and pitch axes, and a sum total of angles of an ankle joint of the right lower leg around the roll, yaw, and pitch axes.

10. The disorder detection system according to claim 8, further comprising a processor configured to specify a physically disordered part of the user based on differences between
a sum total of angles of a hip joint of the left lower leg of the user around the roll, yaw, and pitch axes detected by the angle detection sensor, a sum total of angles of a knee joint of the left lower leg around the roll, yaw, and pitch axes, and a sum total of angles of an ankle joint of the left lower leg around the roll, yaw, and pitch axes, and
a sum total of angles of a hip joint of the right lower leg around the roll, yaw, and pitch axes, a sum total of angles of a knee joint of the right lower leg around the roll, yaw, and pitch axes, and a sum total of angles of an ankle joint of the right lower leg around the roll, yaw, and pitch axes, respectively.

11. The disorder detection system according to claim 10, wherein the processor specifies, as the disordered part, at least one of a pair of hip joints, a pair of knee joints, and a pair of ankle joints of the left and right lower legs of the user of which an angular difference between a sum total of angles of the joint of the left lower leg around the roll, yaw, and pitch axes detected by the angle detection sensor and a sum total of angles of the joint of the right lower leg around the roll, yaw, and pitch axes is equal to or larger than a threshold.

12. A disorder detection method for a disorder detection system,
the disorder detection system comprising:
a sitting part configured to enable a user to sit thereon and rotate around a roll axis and a yaw axis;
a pair of left and right footrests configured so that left and right feet of the user are respectively placed thereon and can rotate around the roll, yaw, and pitch axes, the pair of left and right footrests being configured for the user to perform an exercise of his/her legs; and
a moving mechanism having a pair of left and right shafts rotatably supported in a main body and a pair of left and right cranks respectively connected to the pair of left and right shafts, the moving mechanism configured to enable the left and right footrests to move in a linked manner,
the disorder detection method comprising:
detecting angles of joints of left and right lower legs of the user around a roll axis, a yaw axis, and a pitch axis; and
displaying the detected angles of the joints of the left and right lower legs of the user around the roll, yaw, and pitch axes.

13. A non-transitory computer readable medium storing a program for a disorder detection system,
the disorder detection system comprising:
a sitting part configured to enable a user to sit thereon and rotate around a roll axis and a yaw axis;
a pair of left and right footrests configured so that left and right feet of the user are respectively placed thereon and can rotate around the roll, yaw, and pitch axes, the pair of left and right footrests being configured for the user to perform an exercise of his/her legs; and
a moving mechanism having a pair of left and right shafts rotatably supported in a main body and a pair of left and right cranks respectively connected to the pair of left and right shafts, the moving mechanism configured to enable the left and right footrests to move in a linked manner,
the program being adapted to cause a computer to perform:
a process for detecting angles of joints of left and right lower legs of the user around a roll axis, a yaw axis, and a pitch axis; and
a process for displaying the detected angles of the joints of the left and right lower legs of the user around the roll, yaw, and pitch axes.

* * * * *